(12) United States Patent
Yang et al.

(10) Patent No.: US 9,405,067 B2
(45) Date of Patent: Aug. 2, 2016

(54) MICRO-TRUSS MATERIALS HAVING IN-PLANE MATERIAL PROPERTY VARIATIONS

(71) Applicant: HRL LABORATORIES, LLC, Malibu, CA (US)

(72) Inventors: Sophia S. Yang, Los Angeles, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 104 days.

(21) Appl. No.: 13/802,210

(22) Filed: Mar. 13, 2013

(65) Prior Publication Data

US 2014/0272275 A1 Sep. 18, 2014

(51) Int. Cl.
*G02B 6/138* (2006.01)

(52) U.S. Cl.
CPC ......... *G02B 6/138* (2013.01); *Y10T 428/24149* (2015.01); *Y10T 428/249921* (2015.04); *Y10T 428/249961* (2015.04); *Y10T 428/26* (2015.01)

(58) Field of Classification Search
CPC .................. Y10T 428/24149; Y10T 428/26
See application file for complete search history.

(56) References Cited

U.S. PATENT DOCUMENTS

| | | | |
|---|---|---|---|
| 3,820,596 A | 6/1974 | Weinhardt et al. | |
| 3,829,740 A | 8/1974 | Beasley | |
| 3,834,457 A | 9/1974 | Madsen | |
| 3,882,934 A | 5/1975 | Knoos et al. | |
| 3,893,506 A | 7/1975 | Laing | |
| 3,984,861 A | 10/1976 | Kessler, Jr. | |
| 4,042,757 A | 8/1977 | Jones | |
| 4,220,195 A | 9/1980 | Borgoyn et al. | |
| 4,327,801 A | 5/1982 | Koizumi et al. | |
| 4,344,479 A | 8/1982 | Bailey | |
| 4,419,302 A | 12/1983 | Nishino et al. | |
| 4,602,679 A | 7/1986 | Edelstein et al. | |
| 5,031,401 A | 7/1991 | Hinderks | |
| 5,165,243 A | 11/1992 | Bennett | |
| 5,248,079 A | 9/1993 | Li | |
| 5,343,358 A | 8/1994 | Hilbrink | |
| 5,402,004 A | 3/1995 | Ozmat | |

(Continued)

FOREIGN PATENT DOCUMENTS

| | | |
|---|---|---|
| WO | WO 02/06747 A1 | 1/2002 |
| WO | WO 2013/025800 A2 | 2/2013 |

OTHER PUBLICATIONS

Jacobsen et al., "Interconnected Self-Propagating Photopolymer Waveguides: An Alternative to Stereolithography for Rapid Formation of Lattice-Based Open-Cellular Materials," Twenty First Annual Solid Freeform Fabrication Symposium—An Addictive Manufacturing Conference, pp. 846-853, 2010.

(Continued)

*Primary Examiner* — Hai Vo
(74) *Attorney, Agent, or Firm* — Lewis Roca Rothgerber Christie LLP (57) ABSTRACT

A micro-truss sheet having material properties varying across the sheet. The sheet may include a plurality of truss members intersecting at nodes. The diameter of the truss members at one point in the sheet may differ from the diameter of the truss members at another point in the sheet. In one embodiment the spacing between adjacent truss members may be different in one part of the sheet from the spacing between adjacent truss members in another part of the sheet.

25 Claims, 6 Drawing Sheets

(56) References Cited

U.S. PATENT DOCUMENTS

| | | |
|---|---|---|
| 5,719,444 A | 2/1998 | Tilton et al. |
| 5,761,037 A | 6/1998 | Anderson et al. |
| 5,830,548 A | 11/1998 | Andersen et al. |
| 5,916,505 A | 6/1999 | Cisar et al. |
| 5,972,196 A | 10/1999 | Murphy et al. |
| 6,146,779 A | 11/2000 | Walsh |
| 6,149,810 A | 11/2000 | Gonzalez-Martin et al. |
| 6,205,022 B1 | 3/2001 | Bhatia et al. |
| 6,209,200 B1 | 4/2001 | Campbell |
| 6,266,997 B1 | 7/2001 | Nelson |
| 6,293,332 B2 | 9/2001 | Li |
| 6,341,491 B1 | 1/2002 | Paine et al. |
| 6,475,654 B1 | 11/2002 | Bliesner |
| 6,666,909 B1 | 12/2003 | TeGrotenhuis et al. |
| 6,667,017 B2 | 12/2003 | Murrell et al. |
| 6,733,913 B2 | 5/2004 | Cisar et al. |
| 6,760,222 B1 | 7/2004 | Wang |
| 6,868,898 B2 | 3/2005 | Chau |
| 6,888,720 B2 | 5/2005 | Pfister et al. |
| 7,095,111 B2 | 8/2006 | Hu et al. |
| 7,288,326 B2 | 10/2007 | Elzey et al. |
| 7,360,581 B2 | 4/2008 | Tuma et al. |
| 7,382,959 B1 | 6/2008 | Jacobsen |
| 7,401,643 B2 | 7/2008 | Queheillalt et al. |
| 7,424,967 B2 | 9/2008 | Ervin et al. |
| 7,645,512 B1 | 1/2010 | Sammakia et al. |
| 7,653,276 B1 | 1/2010 | Gross et al. |
| 7,653,279 B1 | 1/2010 | Jacobsen |
| 7,687,132 B1 | 3/2010 | Gross et al. |
| 7,694,725 B2 | 4/2010 | Chang |
| 7,913,611 B2 | 3/2011 | Terry et al. |
| 7,938,989 B1 | 5/2011 | Gross et al. |
| 7,943,263 B2 | 5/2011 | Brantley et al. |
| 8,195,023 B1 | 6/2012 | Jacobsen et al. |
| 8,197,930 B1 | 6/2012 | Jacobsen et al. |
| 8,247,333 B2 | 8/2012 | Sypeck et al. |
| 8,315,499 B1 | 11/2012 | Jacobsen et al. |
| 8,320,727 B1 | 11/2012 | Jacobsen et al. |
| 8,453,717 B1 | 6/2013 | Roper et al. |
| 8,573,289 B1 | 11/2013 | Roper et al. |
| 8,579,018 B1 | 11/2013 | Roper et al. |
| 8,921,702 B1 * | 12/2014 | Carter et al. ............... 174/252 |
| 2002/0020518 A1 | 2/2002 | Li |
| 2002/0056908 A1 | 5/2002 | Brownell et al. |
| 2003/0135181 A1 | 7/2003 | Chen et al. |
| 2003/0180205 A1 | 9/2003 | Carlborg et al. |
| 2004/0123980 A1 | 7/2004 | Queheillalt et al. |
| 2004/0244951 A1 | 12/2004 | Dussinger et al. |
| 2005/0141197 A1 | 6/2005 | Erturk et al. |
| 2005/0202206 A1 | 9/2005 | Wadley et al. |
| 2005/0205242 A1 | 9/2005 | Chien |
| 2005/0205243 A1 | 9/2005 | Rosenfeld et al. |
| 2005/0217826 A1 | 10/2005 | Dussinger et al. |
| 2006/0005960 A1 | 1/2006 | Hsu |
| 2006/0129015 A1 | 6/2006 | Tonkovich et al. |
| 2006/0162907 A1 | 7/2006 | Wu et al. |
| 2006/0194092 A1 | 8/2006 | Kanai et al. |
| 2007/0068654 A1 | 3/2007 | Chang |
| 2007/0068656 A1 | 3/2007 | Lee et al. |
| 2007/0095507 A1 | 5/2007 | Henderson et al. |
| 2007/0102140 A1 | 5/2007 | Tuma et al. |
| 2007/0107875 A1 | 5/2007 | Lee et al. |
| 2007/0163755 A1 | 7/2007 | Kim et al. |
| 2008/0121475 A1 | 5/2008 | Bhaskara |
| 2008/0128898 A1 | 6/2008 | Henderson et al. |
| 2008/0135095 A1 | 6/2008 | Cummings et al. |
| 2008/0226870 A1 | 9/2008 | Sypeck et al. |
| 2008/0253085 A1 | 10/2008 | Soffer |
| 2009/0151923 A1 | 6/2009 | Fedorov |
| 2009/0211735 A1 | 8/2009 | Stenkamp et al. |
| 2009/0212575 A1 | 8/2009 | Larsen et al. |
| 2009/0321053 A1 | 12/2009 | Tegrotenhuis et al. |
| 2010/0155033 A1 | 6/2010 | Holley et al. |
| 2010/0159398 A1 | 6/2010 | Rock et al. |
| 2010/0326644 A1 | 12/2010 | Hung et al. |
| 2012/0301805 A1 | 11/2012 | Rock et al. |

OTHER PUBLICATIONS

International Search Report and Written Opinion for International Application No. PCT/US2013/036960, mailed Dec. 11, 2013, 10 pages.

Jacobsen, A.J., "Compression behavior of micro-scale truss structures formed from self-propagating polymer waveguides", Acta Materialia, 55:6724-6733, 2007.

Jacobsen et al., U.S. Appl. No. 13/428,348; "High Airflow Micro-Truss Structural Apparatus", Application and Office actions, 60 pages.

Carter et al., U.S. Pat. No. 8,921,702 B1 Office Actions, Responses and all references listing on the first 3 pages, 3 pages.

International Preliminary Report on Patentability for International Application No. PCT/US2013/036960, issued Sep. 15, 2015, 7 pages.

* cited by examiner

MICRO-TRUSS MATERIALS HAVING IN-PLANE MATERIAL PROPERTY VARIATIONS

CROSS-REFERENCE TO RELATED APPLICATION(S)

This application incorporates by reference in its entirety, as if set forth in full, U.S. Pat. No. 8,195,023 ("the '023 patent"), entitled "FUNCTIONALLY-GRADED THREE-DIMENSIONAL ORDERED OPEN-CELLULAR MICROSTRUCTURE AND METHOD OF MAKING SAME", and U.S. Pat. No. 7,382,959 ("the '959 patent"), entitled "OPTICALLY ORIENTED THREE-DIMENSIONAL POLYMER MICROSTRUCTURES".

FIELD

The present invention relates to micro-truss materials, and more particularly to micro-truss materials in sheet form, with material properties varying across the sheet.

BACKGROUND

Polymer cellular materials or three-dimensional (3D) microstructures, having the shape of a three-dimensional micro-truss, have numerous applications, including applications as mechanical structures for support, cushioning, and shock-absorption, as heat or mass exchangers or components thereof, and as flow-regulating devices or materials.

In these applications it may be desirable that the properties of a piece of material not be uniform throughout the piece, but varying. For example, in a flow control material, it may be preferred to have a greater rate of flow through one portion of the piece of material than another, or, in a piece of material used as a cushion, it may be preferred that one portion of the cushion be firmer than another portion.

Thus, there is a need for a micro-truss material with non-uniform properties.

SUMMARY

The present invention relates to a micro-truss sheet having material properties that vary across the sheet. The diameter of the truss members, or their spacing, for example, may vary across the sheet, providing a novel material suited to applications in which a non-uniform sheet is preferred.

According to an embodiment of the present invention, there is provided a micro-truss sheet, including: a plurality of first truss members defined by a plurality of first self-propagating polymer waveguides and extending along a first direction; a plurality of second truss members defined by a plurality of second self-propagating polymer waveguides and extending along a second direction; and a plurality of third truss members defined by a plurality of third self-propagating polymer waveguides and extending along a third direction; the plurality of first truss members, the plurality of second truss members, and the plurality of third truss members being integrally provided as one continuous body; the sheet having a length substantially greater than its thickness, and the sheet having a first point and a second point separated along the length of the sheet. Here the diameter of a truss member of the plurality of first truss members, the plurality of second truss members, and the plurality of third truss members at the first point is at least 10% greater than the diameter of a truss member of the plurality of first truss members, the plurality of second truss members, and the plurality of third truss members at the second point.

In one embodiment, the diameter of the truss member of the plurality of first truss members, the plurality of second truss members, and the plurality of third truss members at the first point along the length of the sheet is at least a factor of two greater than the diameter of the truss member of the plurality of first truss members, the plurality of second truss members, and the plurality of third truss members at the second point along the length of the sheet.

In one embodiment, the first truss members, the second truss members, and the third truss members form a periodic structure, wherein a unit cell size of the periodic structure is substantially constant along the length of the sheet.

In one embodiment, the diameter of each of the plurality of first truss members, the plurality of second truss members, and the plurality of third truss members is less than 10 mm.

In one embodiment, the diameter of each of the plurality of first truss members, the plurality of second truss members, and the plurality of third truss members is greater than 10 microns.

In one embodiment, the plurality of first truss members, the plurality of second truss members, and the plurality of third truss members intersect at nodes, wherein the diameter of each of the plurality of first truss members, the plurality of second truss members, and the plurality of third truss members is less than $\frac{1}{3}$ of the minimum distance between nodes.

In one embodiment, the plurality of first truss members, the plurality of second truss members, and the plurality of third truss members intersect at nodes, wherein, at a point in the micro-truss sheet, the diameter of each of the plurality of first truss members, the plurality of second truss members, and the plurality of third truss members is greater than $\frac{1}{20}$ of the minimum distance between nodes.

In one embodiment, the sheet has a width substantially greater than its thickness, and wherein the diameter of a truss member of the plurality of first truss members, the plurality of second truss members, and the plurality of third truss members at a third point along the width of the sheet is at least 10% greater than the diameter of a truss member of the plurality of first truss members, the plurality of second truss members, and the plurality of third truss members at a fourth point along the width of the sheet.

In one embodiment, the sheet has a width substantially greater than its thickness, and wherein the diameter of a truss member of the plurality of first truss members, the plurality of second truss members, and the plurality of third truss members at a third point along the width of the sheet is at least a factor of two greater than the diameter of a truss member of the plurality of first truss members, the plurality of second truss members, and the plurality of third truss members at a fourth point along the width of the sheet.

In one embodiment, the first truss members, the second truss members, and the third truss members form a periodic structure, wherein a unit cell size of the periodic structure at the first point along the length of the sheet differs from a unit cell size at the second point along the length of the sheet.

In one embodiment, the unit cell size of the periodic structure at the first point along the length of the sheet is a positive integer times the unit cell size at the second point along the length of the sheet.

In one embodiment, the ratio of the diameter of the truss member of the plurality of first truss members, the plurality of second truss members, and the plurality of third truss members at the first point, to the minimum distance between nodes at the first point is substantially the same as the ratio of the diameter of the truss member of the plurality of first truss members, the plurality of second truss members, and the plurality of third truss members at the second point, to the minimum distance between nodes at the second point.

In one embodiment, the diameter of a truss member of the plurality of first truss members, the plurality of second truss members, and the plurality of third truss members at a third point along the thickness of the sheet is at least a 10% greater than the diameter of a truss member of the plurality of first truss members, the plurality of second truss members, and the plurality of third truss members at a fourth point along the thickness of the sheet.

According to an embodiment of the present invention, there is provided a three-dimensional ordered open-cellular sheet, having a length substantially greater than its thickness, and including: a first three-dimensional interconnected pattern of truss members defined by a plurality of first self-propagating polymer waveguides, in a first region of the sheet, a second three-dimensional interconnected pattern of truss members defined by a plurality of second self-propagating polymer waveguides, in a second region of the sheet, separated from the first region along the length of the sheet, the first three-dimensional interconnected pattern differing from the second three-dimensional interconnected pattern; and a transition connected with the first three-dimensional interconnected pattern of truss members and the second three-dimensional interconnected pattern of truss members as one continuous body.

In one embodiment, the transition is a third three-dimensional interconnected pattern of truss members defined by a plurality of third self-propagating polymer waveguides, the third three-dimensional interconnected pattern differing from the first three-dimensional interconnected pattern and the second three-dimensional interconnected pattern.

In one embodiment, the first and second three-dimensional interconnected patterns have order in three dimensions.

In one embodiment, the truss members of the third three-dimensional interconnected pattern respectively extend along different directions; and the truss members of the third three-dimensional interconnected pattern interpenetrate each other at a plurality of nodes to form a self-supporting structure.

In one embodiment, at least two of the truss members of the third three-dimensional interconnected pattern intersect each other at a node of the plurality of nodes at non-perpendicular angles.

In one embodiment, at least three of the truss members of the third three-dimensional interconnected pattern intersect each other at a node of the plurality of nodes at non-perpendicular angles.

In one embodiment, at least four of the truss members of the third three-dimensional interconnected pattern intersect each other at a node of the plurality of nodes at non-perpendicular angles.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of micro-truss materials having in-plane material property variations provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
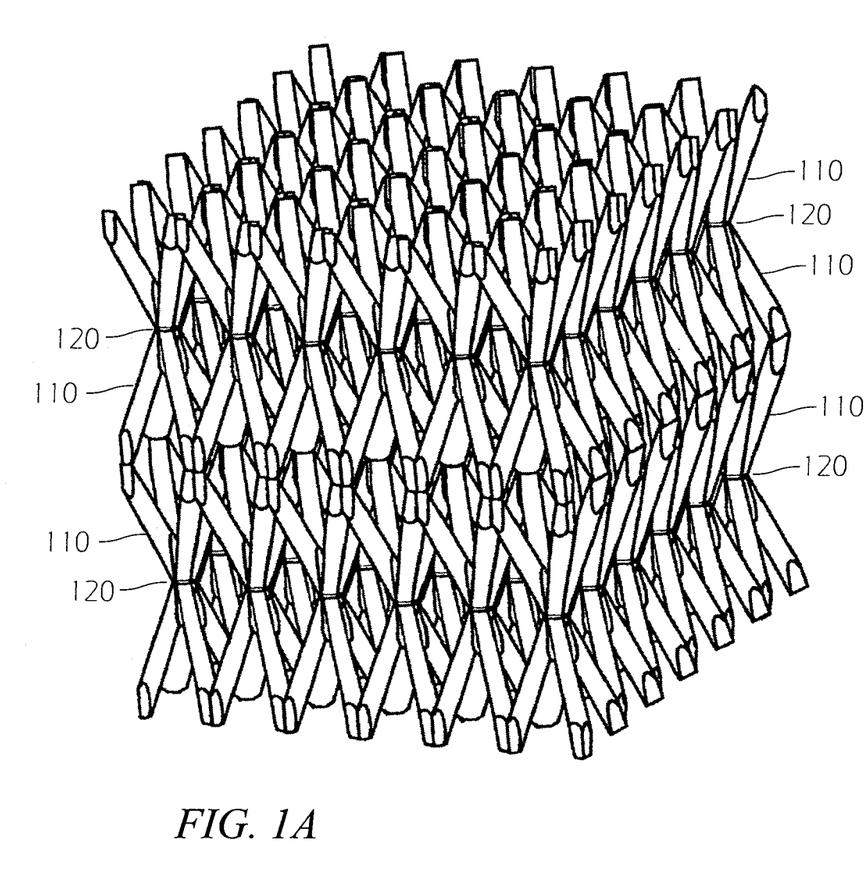
FIG. 1A is a perspective view of a micro-truss structure forming a part of a micro-truss sheet according to an embodiment of the present invention.
Figure 1B:
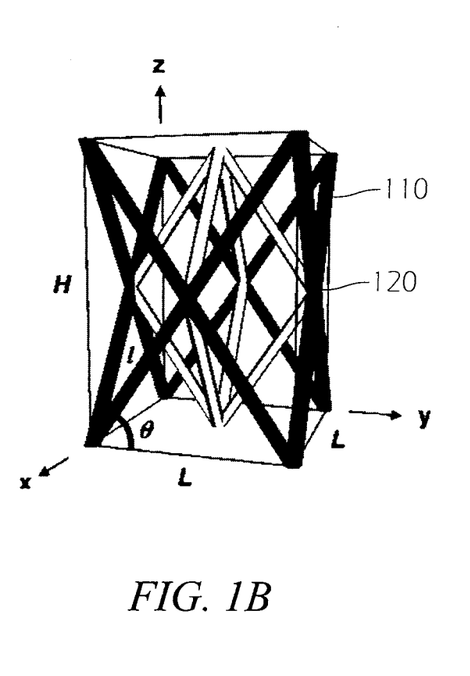
FIG. 1B is a perspective view of a unit cell of a micro-truss sheet according to an embodiment of the present invention.
Figure 2A:
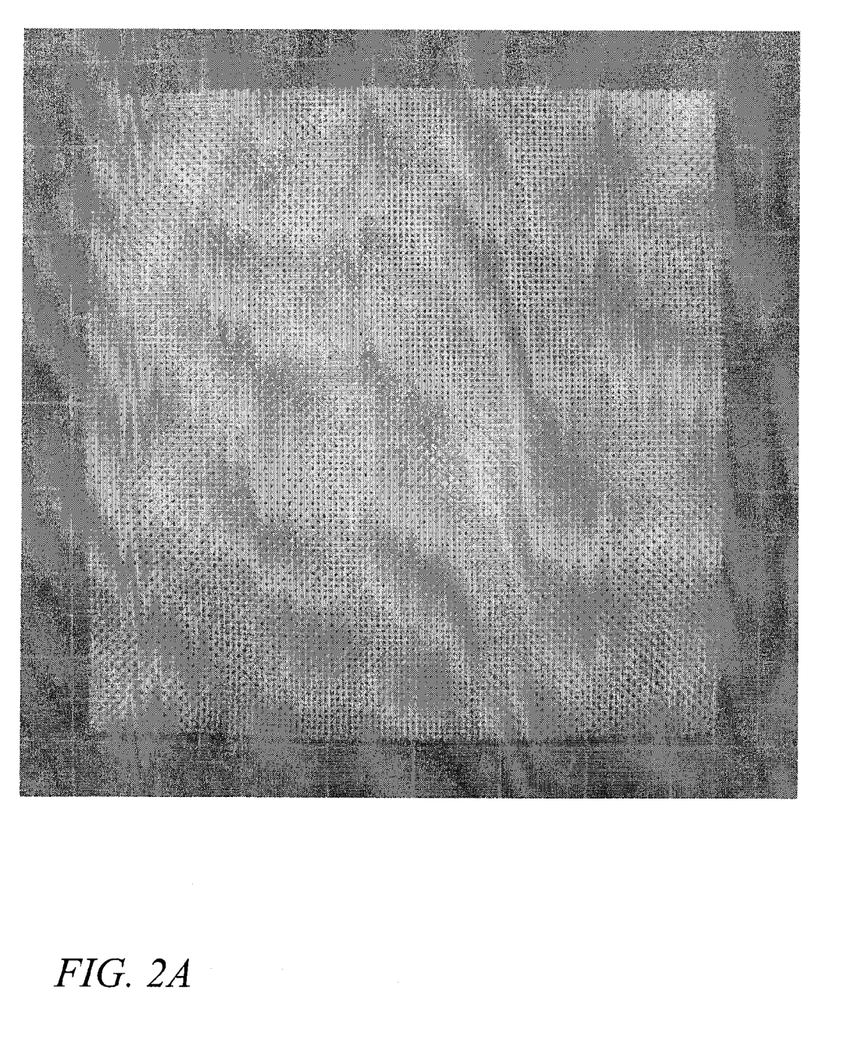
FIG. 2A is a top-view photograph of a micro-truss sheet having non-uniform properties across the sheet according to an embodiment of the present invention.
Figure 2B:
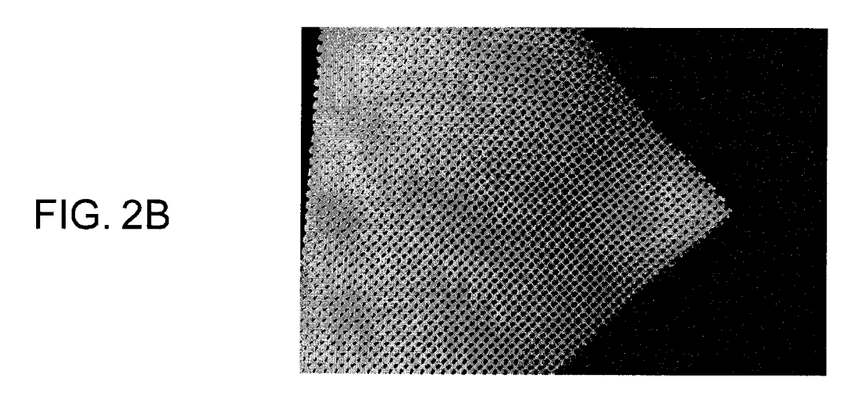
FIG. 2B is a close-up photograph of a portion of the sheet of FIG. 2A.
Figure 2C:
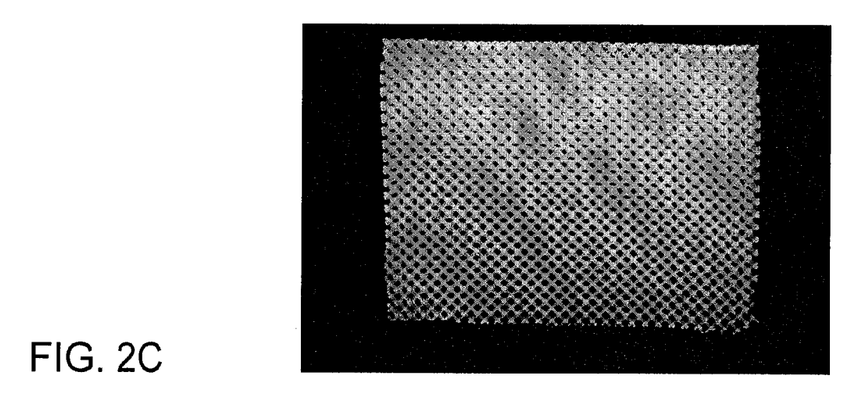
FIG. 2C is a close-up photograph of another portion of the sheet of FIG. 2A.
Figure 2D:
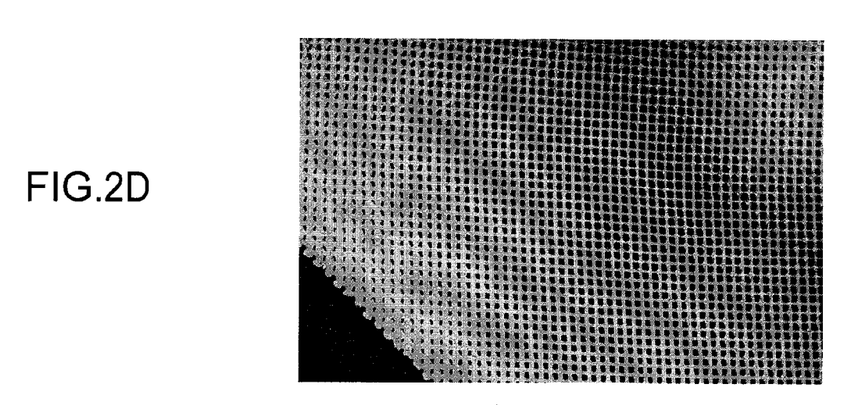
FIG. 2D is a close-up photograph of another portion of the sheet of FIG. 2A.

Referring to FIG. 1A, according to an embodiment of the present invention, a portion of a micro-truss sheet with properties varying across the sheet may include a plurality of truss members 110 intersecting at nodes 120. In an exemplary process for forming such a micro-truss sheet, a suitable photopolymerizable resin may be poured into a tray and covered with a mask having an array of holes. The tray may be irradiated, through the mask, with collimated light. The collimated light entering the mask from a given direction through a given hole in the mask takes the shape of a beam of light in the resin, causing one or more chemical changes in the resin within the beam. These chemical changes may affect the index of refraction, and as a result the beam may cause a waveguide to form in the resin, which then in turn guides the beam along the path where the waveguide has already formed, thereby acting as a self-propagating waveguide. In particular, in one embodiment of the present invention, the collimated light may cause the resin to polymerize, and the polymer waveguides formed by exposure to beams from different directions may intersect, e.g., interpenetrate, resulting in a three-dimensional interconnected pattern, or three dimensional micro-truss, composed of truss members 110 defined by self-propagating waveguides, which intersect at nodes 120. In one embodiment, collimated light from at least three different directions is used, and the directions may be oblique, i.e., non-perpendicular, to each other. If desired, the mask may be replaced with a different mask, and this process may be repeated, to form additional polymer waveguides. The unreacted resin may then be washed away, leaving the micro-truss, which may be sufficiently sturdy to form a self-supporting structure. The assembly of truss members 110 intersecting at nodes 120 illustrated in FIG. 1A may be a portion of a sheet, having a length and a width substantially greater than its thickness. Referring to FIG. 1B, the structure may have order in three dimensions, and in particular it may be periodic, and at any point in the sheet it may be possible to identify a unit cell, i.e., a portion of the structure which in a neighborhood of the point is repeated in the structure, and which is the smallest such portion. Any two nodes 120 selected from the set of nodes in the neighborhood of a point in the micro-truss sheet are separated by some distance; the smallest such distance for any two nodes in the neighborhood may be referred to as the minimum distance between nodes at that point in the micro-truss sheet.

Referring to FIGS. 2A, 2B, 2C, and 2D, in one embodiment a micro-truss sheet having substantially constant unit cell size across the sheet, and correspondingly having substantially constant separation between adjacent truss members 110 and between adjacent nodes 120, may have the diameter of the truss members 110 vary across the sheet, i.e., the truss members 110 may be thicker at one point (a first point) in the sheet than at another point (a second point) in the sheet. As used herein, a variation across the sheet signifies a variation in an in-plane direction, i.e., a variation along the length of the sheet, or along the width of the sheet, or along a direction between the two. In one embodiment, the difference in diameter may be 10% or more, or a factor of 2 or more, and the diameter may be in the range of 50 microns to 10 mm. The diameter may also be greater than 1/20 and less than one third of the minimum distance between adjacent nodes. This variation in the truss member diameter may result in the stiffness of the sheet being greater in regions where the truss members 110 are thicker (greater diameter), and the resistance to fluid flow through the sheet, either in the plane of the sheet or perpendicular to the plane of the sheet, being greater where the truss members 110 are thicker and the gaps between adjacent truss members 110 correspondingly reduced.

A micro-truss sheet with varying properties across the sheet may equivalently be considered to be composed of a plurality of three-dimensional interconnected patterns, with, e.g., a first three-dimensional interconnected pattern having truss members 110 of smaller diameter and a second three-dimensional interconnected pattern having truss members 110 of larger diameter, with a transition between the first three-dimensional interconnected pattern and the second three-dimensional interconnected pattern. The transition may be abrupt, or it may be a region of the micro-truss sheet in which the properties of the sheet change continuously.

Figure 3:
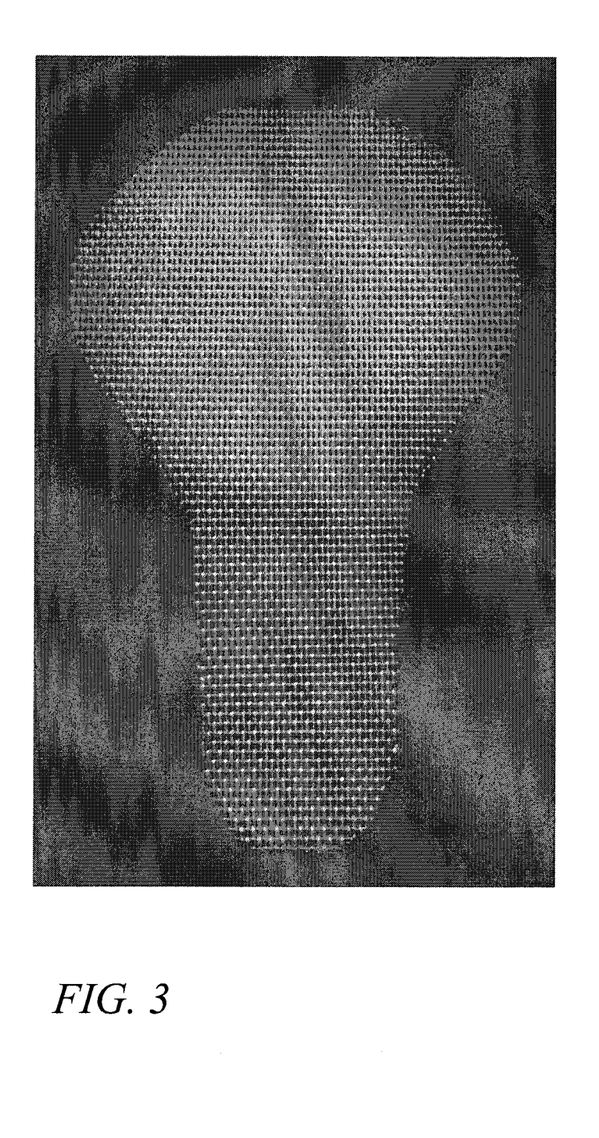
FIG. 3 is a top-view photograph of a non-rectangular sheet having non-uniform properties across the sheet according to an embodiment of the present invention.

Referring to FIG. 3, in one embodiment a bicycle seat pad is fabricated with thicker truss members 110 in the rear portion of the seat, which in operation bears most of the cyclist's weight. Other example applications include panels with a preferred direction of flow, separator materials with different flow rates in a single direction, thermal management structures (heat pipes, cold plates, etc.), cross-flow mass transport, seats, seat backs, and cushions for recreational or professional bicycles, motorbikes, scooters, all-terrain vehicles (ATVs), go-carts and the like, helmets, including helmets for football, fencing, biking, rock climbing, and kayaking, sports padding, sports clothing, shoe insoles, eyeglass frames and pads, undergarments, beds, mattresses, mattress toppers, headbands and hair bands, office chairs, blast protection, and outdoor seating for hot summer locations.

Figure 4:
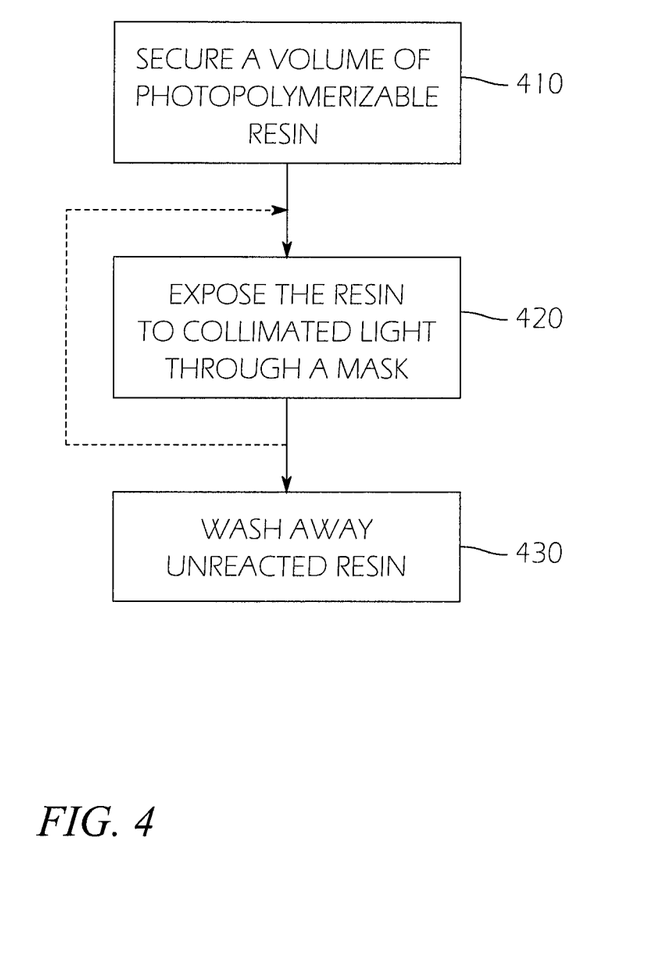
FIG. 4 is a flowchart illustrating a process for forming a micro-truss sheet having non-uniform properties across the sheet according to an embodiment of the present invention.

Referring to FIG. 4, in one embodiment, a micro-truss sheet with properties varying across the sheet may be fabricated as follows. In a first act 410, a volume of photopolymerizable resin may be secured, i.e., poured into a tray, or supported on a conveyor, or the like. In a subsequent act 420, the photopolymerizable resin may be illuminated through a mask by one or more sources of collimated light. In one embodiment, the photopolymerizable resin is illuminated concurrently or simultaneously through a mask by several sources of collimated light; in another embodiment the photopolymerizable resin is illuminated through a mask by one source of collimated light at a time. The act 420 may be repeated, as indicated by the dashed line in FIG. 4. A different mask may be used when the act 420 is repeated. In one embodiment, a first mask having small holes in one region of the mask is used for a first exposure. The first mask is then replaced with a second mask having larger holes, in a different region of the mask, the holes in the second mask having the same spacing as holes in the first mask, and registered relative to the waveguides formed during the first exposure so that some of the waveguides formed in the second exposure intersect waveguides formed in the first exposure. This process may be repeated multiple times with different masks having holes of various suitable diameters in different suitable regions. Waveguides formed during any exposure may intersect waveguides formed during the immediately previous exposure, or waveguides formed during other exposures, or no waveguides. If a set of waveguides formed during an exposure does not intersect other waveguides then the set of waveguides may nonetheless eventually be made a part of the sheet by exposures subsequently producing waveguides intersecting the set of waveguides as well as other already-produced waveguides. Finally, in an act 430, the unreacted resin may be washed away. In another embodiment, a method for fabricating a micro-truss sheet with properties varying across the sheet involves using a single mask with a tailored pattern of apertures with varying diameter sizes.

Figure 5:
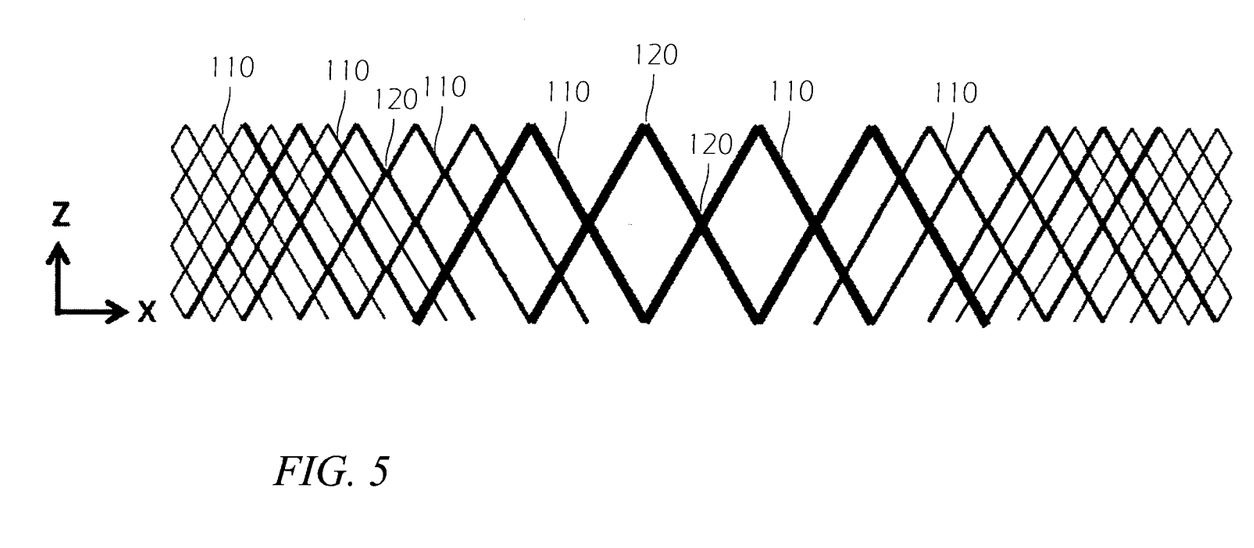
FIG. 5 is a schematic side view of a micro-truss sheet having non-uniform properties across the sheet according to another embodiment of the present invention.

In one embodiment, the unit cell size and the separation between adjacent truss members 110 in FIG. 5 varies across the micro-truss sheet and the truss member diameter is substantially constant across the sheet. Referring to FIG. 5, in another embodiment both the unit cell size and the truss member diameter vary across the micro-truss sheet, in addition to, or instead of, the unit cell size. In FIG. 5 the Z direction indicated is in the direction of the thickness of the sheet, and the X direction is in a direction across the sheet, e.g., X may be in the direction of the length of the sheet, or in the direction of the width of the sheet. Such a micro-truss sheet may be fabricated by using, in the repeated execution of act 420 of FIG. 4, masks with holes having spacing varying from one mask to the next, the spacing corresponding to the different unit cell sizes to be formed. In one embodiment, these parameters vary inversely, i.e., the ratio of unit cell size to truss member diameter is substantially constant across the micro-truss sheet, where the unit cell size is measured as a linear dimension of the unit cell, such as the quantity L in FIG. 1B. In this embodiment, the density of the micro-truss sheet, and other mechanical properties, remain relatively constant across the sheet, while the resistance to fluid flow may be significantly greater in regions of small unit-cell size. In one embodiment, the unit cell size may change in specific increments, across the micro-truss sheet, so as not to disturb the intersecting truss members 110 at each node 120. For example, the unit cell size may be 0.5 L in one region, and 2 L, 4 L, etc., in other regions of the micro-truss sheet. The unit cell size may change by a factor which is a positive integer, at a boundary between regions of different unit cell size.

A micro-truss sheet fabricated according to embodiments of the present invention may be one continuous body, e.g., the micro-truss sheet may have a substantially uniform material composition within the truss elements along the length and width of the sheet. In particular, such a structure may lack intervening structures such as walls or partitions, or adhesive joints.

In one embodiment, changes in truss member diameter occur relatively gradually across the micro-truss sheet, so that within a unit cell all of the truss members 110 have substantially the same diameter. Other properties of the micro-truss may be caused to vary across the micro-truss sheet, such as the angles between the truss members 110. Micro-truss sheets may be fabricated which are functionally graded out of plane, as described for example in the '023 patent, and which also have in-plane material property variations. The micro-truss sheets described herein may be used as templates formed as an initial act in fabricating other materials, as, for example, by coating the truss members 110 and nodes 120 of a micro-truss sheet in another material, different from the material forming the truss members 110.

Although exemplary embodiments of micro-truss materials having in-plane material property variations have been specifically described and illustrated herein, many modifications and variations will be apparent to those skilled in the art. Accordingly, it is to be understood that micro-truss materials having in-plane material property variations constructed according to principles of this invention may be embodied other than as specifically described herein. The invention is also defined in the following claims, and equivalents thereof.

What is claimed is:

1. A micro-truss sheet, including:
a plurality of first truss members defined by a plurality of first self-propagating polymer waveguides and extending along a first direction;
a plurality of second truss members defined by a plurality of second self-propagating polymer waveguides and extending along a second direction; and
a plurality of third truss members defined by a plurality of third self-propagating polymer waveguides and extending along a third direction;
wherein each truss member has a diameter;
the sheet having a length substantially greater than its thickness, and
the sheet having a first region comprising a plurality of first unit cells and a second region comprising a plurality of second unit cells, the first region and the second region being separated along the length of the sheet,
wherein all the truss members within the first unit cells have the same diameter,
wherein all the truss members within the second unit cells have the same diameter,
wherein the diameter of each of the plurality of first truss members, the plurality of second truss members, and the plurality of third truss members within the first unit cells
in the first region
is at least 10% greater than
the diameter of each of the plurality of first truss members, the plurality of second truss members, and the plurality of third truss members within the second unit cells
in the second region, and
wherein the micro-truss sheet forms one continuous body, having a gradient in the diameter of the truss members of the plurality of first truss members, the plurality of second truss members, and the plurality of third truss members, along the length of the sheet.

2. The micro-truss sheet of claim 1, wherein the diameter of each of the plurality of first truss members, the plurality of second truss members, and the plurality of third truss members within the first unit cells in the first region along the length of the sheet
is at least a factor of two greater than
the diameter of each of the plurality of first truss members, the plurality of second truss members, and the plurality of third truss members within the second unit cells in the second region along the length of the sheet.

3. The micro-truss sheet of claim 1, wherein the first truss members, the second truss members, and the third truss members form a periodic structure, wherein a unit cell size of the periodic structure is substantially constant along the length of the sheet.

4. The micro-truss sheet of claim 1, wherein the diameter of each of the plurality of first truss members, the plurality of second truss members, and the plurality of third truss members is less than 10 mm.

5. The micro-truss sheet of claim 1, wherein the diameter of each of the plurality of first truss members, the plurality of second truss members, and the plurality of third truss members is greater than 10 microns.

6. The micro-truss sheet of claim 1, wherein the plurality of first truss members, the plurality of second truss members, and the plurality of third truss members intersect at nodes, wherein the diameter of each of the plurality of first truss members, the plurality of second truss members, and the plurality of third truss members is less than $1/3$ of a minimum distance between nodes.

7. The micro-truss sheet of claim 1, wherein the plurality of first truss members, the plurality of second truss members, and the plurality of third truss members intersect at nodes, wherein, in the first region, the diameter of each of the plurality of first truss members, the plurality of second truss members, and the plurality of third truss members is greater than $1/20$ of a minimum distance between nodes.

8. The micro-truss sheet of claim 1, wherein the sheet has a width, in a direction orthogonal to the length, substantially greater than its thickness,
the sheet having a third region comprising a plurality of third unit cells and a fourth region comprising a plurality of fourth unit cells, the third region and the fourth region being separated along the width of the sheet,
wherein all the truss members within the third unit cells have the same diameter,
wherein all the truss members within the fourth unit cells have the same diameter, and
wherein the diameter of each of the plurality of first truss members, the plurality of second truss members, and the plurality of third truss members within the third unit cells
in the third region
is at least 10% greater than
the diameter of each of the plurality of first truss members, the plurality of second truss members, and the plurality of third truss members within the fourth unit cells
in the fourth region.

9. The micro-truss sheet of claim 8,
wherein the diameter of each of the plurality of first truss members, the plurality of second truss members, and the plurality of third truss members within the third unit cells
in the third region
is at least a factor of 2 greater than
the diameter of each of the plurality of first truss members, the plurality of second truss members, and the plurality of third truss members within the fourth unit cells
in the fourth region.

10. The micro-truss sheet of claim 1, wherein the first truss members, the second truss members, and the third truss members form a periodic structure, wherein a unit cell size of the periodic structure in the first region along the length of the sheet differs from a unit cell size in the second region along the length of the sheet.

11. The micro-truss sheet of claim 10, wherein:
the unit cell shape of the periodic structure in the first region along the length of the sheet is the same as the unit cell shape in the second region along the length of the sheet, and
the unit cell size of the periodic structure in the first region along the length of the sheet is a positive integer times the unit cell size in the second region along the length of the sheet.

12. The micro-truss sheet of claim 1, wherein the ratio of
the diameter of a truss member of the plurality of first truss members, the plurality of second truss members, and the plurality of third truss members in the first region, to
a minimum distance between nodes
in the first region
is substantially the same as the ratio of
the diameter of a truss member of the plurality of first truss members, the plurality of second truss members, and the plurality of third truss members in the second region, to
a minimum distance between nodes
in the second region.

13. The micro-truss sheet of claim 1,
the sheet having a third region comprising a plurality of third unit cells and a fourth region comprising a plurality of fourth unit cells, the third region and the fourth region being separated along the thickness of the sheet,
wherein all the truss members within the third unit cells have the same diameter,
wherein all the truss members within the fourth unit cells have the same diameter, and
wherein the diameter of each of the plurality of first truss members, the plurality of second truss members, and the plurality of third truss members within the third unit cells
in the third region
is at least 10% greater than
the diameter of each of the plurality of first truss members, the plurality of second truss members, and the plurality of third truss members within the fourth unit cells
in the fourth region.

14. The micro-truss sheet of claim 1, wherein the first unit cell includes an open volume enclosed by first, second, and third truss members.

15. The micro-truss sheet of claim 14, wherein the open volume is enclosed only by the largest diameter first, second, and third truss members within the first unit cell.

16. The micro-truss sheet of claim 1, wherein the sheet has a third region, the third region comprising a plurality of third unit cells and being separated from the first region and from the second region along the length of the sheet,
wherein all the truss members within the third unit cells have the same diameter, and
wherein the diameter of each of the plurality of first truss members, the plurality of second truss members, and the plurality of third truss members within the third unit cells
in the third region
is at least 10% less than
the diameter of each of the plurality of first truss members, the plurality of second truss members, and the plurality of third truss members within the second unit cells
in the second region.

17. The micro-truss sheet of claim 1,
wherein the diameter of each of the plurality of first truss members, the plurality of second truss members, and the plurality of third truss members within the first unit cells
in the first region
is at least 20% greater than
the diameter of each of the plurality of first truss members, the plurality of second truss members, and the plurality of third truss members within the second unit cells
in the second region.

18. The micro-truss sheet of claim 1,
wherein the diameter of each of the plurality of first truss members, the plurality of second truss members, and the plurality of third truss members within the first unit cells
in the first region
is at least 30% greater than
the diameter of each of the plurality of first truss members, the plurality of second truss members, and the plurality of third truss members within the second unit cells
in the second region.

19. A three-dimensional ordered open-cellular sheet,
having a length substantially greater than its thickness, and including:
(i) a first three-dimensional interconnected pattern of truss members defined by a plurality of first self-propagating polymer waveguides,
in a first region of the sheet,
the first three-dimensional interconnected pattern of truss members comprising:
a plurality of first truss members defined by a plurality of first self-propagating polymer waveguides and extending along a first direction;
a plurality of second truss members defined by a plurality of second self-propagating polymer waveguides and extending along a second direction; and
a plurality of third truss members defined by a plurality of third self-propagating polymer waveguides and extending along a third direction;
the first region of the sheet comprising a plurality of first unit cells;
(ii) a second three-dimensional interconnected pattern of truss members defined by a plurality of second self-propagating polymer waveguides,
in a second region of the sheet, separated from the first region along the length of the sheet,
the second three-dimensional interconnected pattern of truss members comprising:
a plurality of first truss members defined by a plurality of first self-propagating polymer waveguides and extending along a first direction;
a plurality of second truss members defined by a plurality of second self-propagating polymer waveguides and extending along a second direction; and
a plurality of third truss members defined by a plurality of third self-propagating polymer waveguides and extending along a third direction;
the second region of the sheet comprising a plurality of second unit cells;
the first three-dimensional interconnected pattern differing from the second three-dimensional interconnected pattern; and
(iii) a transition connected with the first three-dimensional interconnected pattern of truss members and the second three-dimensional interconnected pattern of truss members as one continuous body, the transition comprising:
- a plurality of first truss members defined by a plurality of first self-propagating polymer waveguides and extending along a first direction;
- a plurality of second truss members defined by a plurality of second self-propagating polymer waveguides and extending along a second direction; and
- a plurality of third truss members defined by a plurality of third self-propagating polymer waveguides and extending along a third direction;

wherein the transition has a gradient in the diameter of the truss members of the plurality of first truss members, the plurality of second truss members, and the plurality of third truss members, along the length of the three-dimensional ordered open-cellular sheet, wherein all the truss members within the first unit cells have the same diameter, wherein all the truss members within the second unit cells have the same diameter, wherein the diameter of each of the plurality of first truss members, the plurality of second truss members, and the plurality of third truss members within the first unit cells in the first region is at least 10% greater than the diameter of each of the plurality of first truss members, the plurality of second truss members, and the plurality of third truss members within the second unit cells in the second region.

20. The three-dimensional ordered open-cellular sheet of claim 19, wherein the transition is a third three-dimensional interconnected pattern of truss members defined by a plurality of third self-propagating polymer waveguides, the third three-dimensional interconnected pattern differing from the first three-dimensional interconnected pattern and the second three-dimensional interconnected pattern.

21. The three-dimensional ordered open-cellular sheet of claim 20, wherein:
- the truss members of the third three-dimensional interconnected pattern respectively extend along different directions; and
- the truss members of the third three-dimensional interconnected pattern interpenetrate each other at a plurality of nodes to form a self-supporting structure.

22. The three-dimensional ordered open-cellular sheet of claim 21, wherein at least two of the truss members of the third three-dimensional interconnected pattern intersect each other at a node of the plurality of nodes at non-perpendicular angles.

23. The three-dimensional ordered open-cellular sheet of claim 21, wherein at least three of the truss members of the third three-dimensional interconnected pattern intersect each other at a node of the plurality of nodes at non-perpendicular angles.

24. The three-dimensional ordered open-cellular sheet of claim 21, wherein at least four of the truss members of the third three-dimensional interconnected pattern intersect each other at a node of the plurality of nodes at non-perpendicular angles.

25. The three-dimensional ordered open-cellular sheet of claim 19, wherein the first and second three-dimensional interconnected patterns have order in three dimensions.

* * * * *